US012698050B1

(12) United States Patent
VanValkenburgh

(10) Patent No.: US 12,698,050 B1
(45) Date of Patent: Aug. 4, 2026

(54) MOTORCYCLE GAS CAP

(71) Applicant: Pit Bull Products, Inc., Huntsville, AL (US)

(72) Inventor: Charles VanValkenburgh, Huntsville, AL (US)

(73) Assignee: Pit Bull Products, Inc., Huntsville, AL (US)

( * ) Notice: Subject to any disclaimer, the term of this patent is extended or adjusted under 35 U.S.C. 154(b) by 0 days.

(21) Appl. No.: 19/042,212

(22) Filed: Jan. 31, 2025

(51) Int. Cl.
| | |
|---|---|
| *B62J 35/00* | (2006.01) |
| *B65D 51/16* | (2006.01) |
| *B60K 15/035* | (2006.01) |
| *B60K 15/04* | (2006.01) |

(52) U.S. Cl.
CPC .......... *B62J 35/00* (2013.01); *B65D 51/1644* (2013.01); *B60K 15/035* (2013.01); *B60K 2015/03528* (2013.01); *B60K 15/0409* (2013.01)

(58) Field of Classification Search
CPC .... B62J 35/00; B60K 15/03006; B60K 15/03; B60K 15/035; B60K 15/0409; B60K 15/0406; B60K 15/04; B65D 51/1644; B65D 41/0435; B65D 41/0407; B65D 41/06; B65D 41/04
USPC .............. 220/562, 308, 304, 295, 293, 288, 220/203.21, 203.22, 203.23, 203.19
See application file for complete search history.

(56) References Cited

U.S. PATENT DOCUMENTS

| | | | | |
|---|---|---|---|---|
| 1,826,000 | A * | 10/1931 | Fisher ................. | F01P 11/0214 |
| | | | | 220/295 |
| 4,091,955 | A * | 5/1978 | Sloan, Sr. .......... | B60K 15/0406 |
| | | | | 220/203.23 |
| 4,162,021 | A * | 7/1979 | Crute ................. | B60K 15/0406 |
| | | | | 137/533.15 |
| 5,395,004 | A * | 3/1995 | Griffin .............. | B60K 15/0406 |
| | | | | 220/295 |
| 2011/0240643 | A1 * | 10/2011 | Ripberger, Jr. .......... | G08B 3/02 |
| | | | | 220/212.5 |
| 2011/0290806 | A1 * | 12/2011 | Heidrich ................ | A47J 27/09 |
| | | | | 220/582 |
| 2015/0041466 | A1 * | 2/2015 | Koishikawa ............. | B62J 35/00 |
| | | | | 220/203.01 |
| 2025/0121679 | A1 * | 4/2025 | Hieber ................ | B60K 15/035 |
| 2025/0121995 | A1 * | 4/2025 | Zutler ................ | A47L 11/4083 |

FOREIGN PATENT DOCUMENTS

FR        3000939 A1 *  7/2014  ........ B65D 51/1644

* cited by examiner

*Primary Examiner* — Robert J Hicks
(74) *Attorney, Agent, or Firm* — Adam K. Sacharoff; Much Shelist, PC

(57) ABSTRACT

A motorcycle gas cap for use with a motorcycle that has a gas tank, a recessed space, and an opening to receive fuel, and a tube to vent air. The gas cap has a base secured into the recessed space. The base having a base opening configured for fluid exchange with the gas tank opening and the base further having a ventilation mechanism. The gas cap is removably configured to twist in one direction into a locking position and twist in an opposition direction to an unlocking position such that the gas cap is removable from the base. The gas cap has a plunger extending downwardly from the gas cap. A hole is positioned on a top portion of the base and sized to receive the plunger such that when the gas cap is removed from the base the plunger can rest in the hole.

16 Claims, 18 Drawing Sheets

FRONT OF MOTORCYCLE

FRONT OF MOTORCYCLE

FRONT
OF
MOTORCYCLE

FRONT
OF
MOTORCYCLE

FRONT
OF
MOTORCYCLE

FRONT OF MOTORCYCLE

FORCE APPLIED DOWNWARD BY RAMP 12

FORCE EXERTED BY SPRING & PLUNGER

LOCKING PIN TRAVEL ALLOWED

27

28

32

5

30

29

31

MOTORCYCLE GAS CAP

BACKGROUND OF THE INVENTION

Motorcycles, like all gasoline-powered vehicles, have a storage container (aka, fuel tank, gas tank) with a means to deliver fuel to the engine. The fuel tank must also allow fuel to be put in and have a means to be closed to prevent fuel from splashing out and to prevent rain or debris from entering the tank. Further, in order to allow fuel to flow to the engine without creating a vacuum, there must be a means of ventilation. The ventilation system ideally closes off should the motorcycle lay on its side or upside down to prevent gasoline from spilling out.

Motorcycles come equipped with gas caps, but virtually all original equipment gas caps are lockable with a key. In the interest of speed and convenience, many motorcycle owners (users) desire to have a gas cap that does not require a key to unlock. Motorcycle users, especially those that race or are interested in performance, also often desire motorcycle components to be light weight.

There are a variety of lightweight, non-key lockable motorcycle gas caps available to the motorcyclist. These normally consist of a base that is permanently attached to the gas tank and a removable cap that is screwed into place with multiple turns. These caps generally do not have a means of storage while gas is being put into the tank. The user is therefore required to hold the cap or place it out of the way during fueling. The cap is often placed on the motorcycle itself and is vulnerable to falling on the ground. The following sections describe how the present invention uniquely addresses storage of the detachable cap as well as general operation of the device.

SUMMARY OF THE INVENTION

The present invention is a lightweight keyless gas cap 1 for motorcycles. It uniquely features a cylindrical feature 10 that is part of the cap 3 and is insertable into a cylindrical hole 7 featured on the base 2 to allow the user to store the cap while the motorcycle is being fueled.

Operationally, cap 3 inserts into base 2 at roughly a 45-degree angle with respect to the front of the motorcycle. At this point locking pin 5 and the insertion gap 35 are aligned. The cap is then rotated clockwise ⅛th turn (45-degrees) so that it snaps into place at the end of travel which is the zero-degree position or front of the motorcycle. Spring force on the locking pin 5 provides the "snap" feel as it rides into a detent feature 14. The result is a passive lock that is firm enough to avoid inadvertent unseating of the gas cap yet compliant enough to allow the user to unseat.

To unseat cap 3 from the base 2, the cap is rotated counterclockwise. If rotated 45 degrees counterclockwise from the locked position, the locking pin 5 aligns with insertion gap 35. At this point, the cap could be pulled out of the cap except that the O-ring seal 28 on the cap is still frictionally engaged with the base 2 in the sealing area 39. To disengage the O-ring 28 from the sealing area 39, the user continues to rotate the cap counterclockwise. This motion forces the cap upward from the base as the locking pin 5 rides up the removal ramp 13, freeing the cap 3 to be totally removed from the base.

Clockwise and counterclockwise motion is exerted to the cap by the user via raised portions 33 of the cap 3. The raised portions 33 also serve as handles for lifting and lowering the cap. The height of the raised portions is limited so not to encroach on user space or become an impalement hazard.

Once the cap 3 is free from the base 2, the cap is stored in the base by insertion of cylindrical feature 10 into cylindrical hole 7.

A raised feature 4 on the base 2 provides a visual aide to align with raised rib 33 of the cap to show the user where the 45-degree insertion gap 35 is. The curved raised feature 4 has a pronounced feature 36 perpendicular to the curve at zero degrees (forward direction of the gas tank 11). When the raised rib 33 of the gas cap aligns with the pronounced feature 36 of the base the user sees that the cap is at end of travel and snapped closed. The visual alignment aides are reinforced with grooves 8 on the base and 9 on the cap that align when the cap is in the end of travel locked position.

Additional curved raised features 34 are part of base 2 and shaped to partially mimic the shape of the cap 3 and serve as a target for inserting the cylindrical feature 10 into the cylindrical hole 7.

The cap and base features are symmetrical about the center axis 46 such that features are repeated at 180-degrees. This allows the cap and base relationship to be used the same if rotated 180 degrees with respect to each other.

The invention is adaptable for use on motorized vehicles other than motorcycles. It is also adaptable for any fuel tank or container of liquid.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 11 is a flattened-out depiction of the ramps and detents in the base of the device that the cap of the device interacts with.

FIG. 18 is a sectioned view showing the assembled cap of the device depicting forces acting on the locking pin by the spring, ramps and detents.

DETAILED DESCRIPTION OF THE INVENTION

Figure 1:
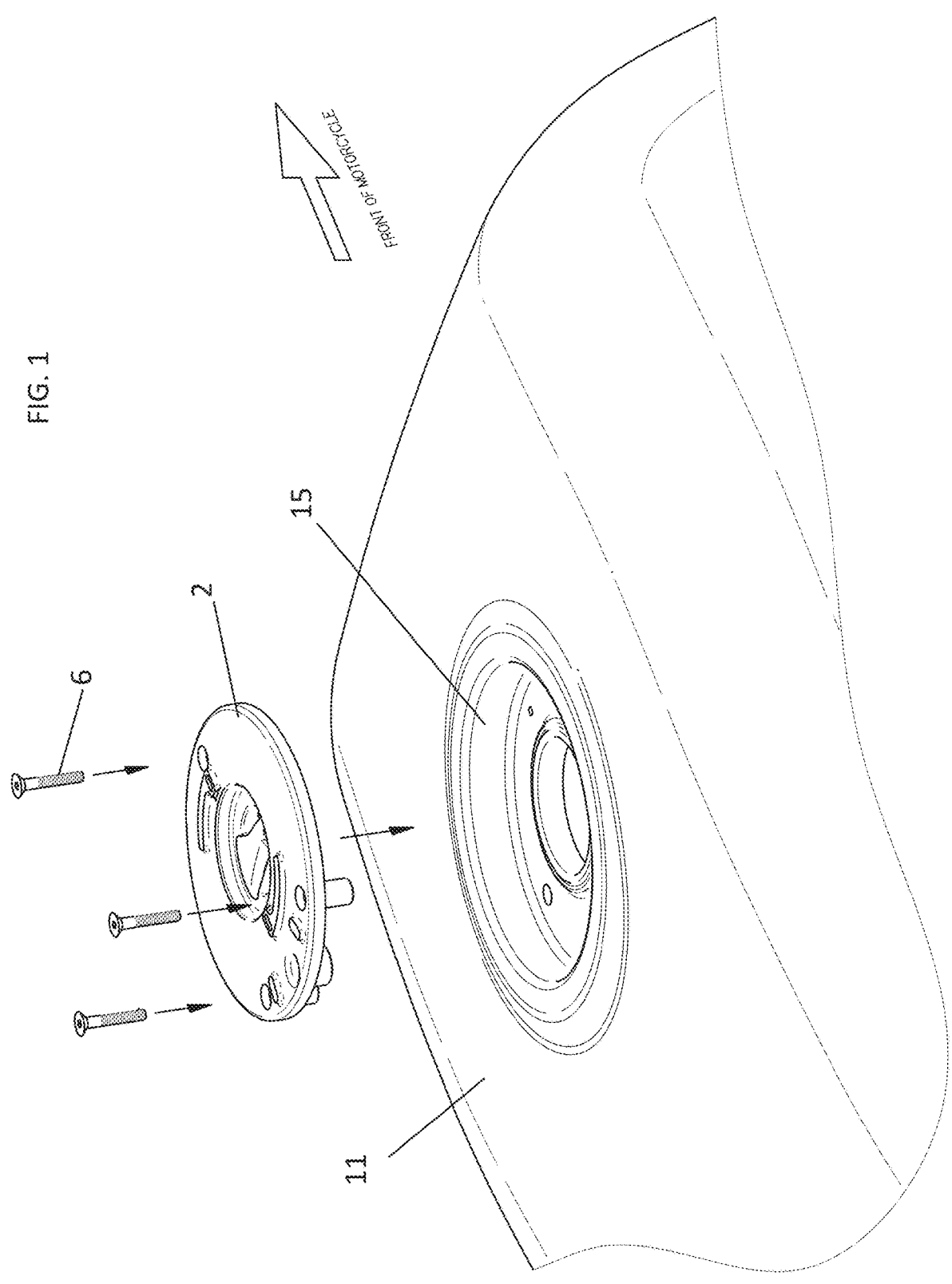
FIG. 1 is a pictorial view showing the base of the device being installed onto a motorcycle gas tank.

While the invention is susceptible to embodiments in many different forms, there are shown in the drawings and will be described in detail herein the preferred embodiments of the present invention. It should be understood, however, that the present disclosure is to be considered an exemplification of the principles of the invention and is not intended to limit the spirit or scope of the invention and/or claims of the embodiments illustrated.

Referring to FIGS. 1-18, the present invention is a lightweight, keyless motorcycle gas cap that is intended to be used in place of the original equipment gas cap that is typically heavier and requires a key to operate.

As shown in FIG. 1, base 2 is installed onto gas tank 11 using screws 6. An elastomeric (rubber) seal 20 on the bottom of the base forms an air- and fuel-tight seal with the gas tank. There is a recessed cylindrical open space 15 at the top of the gas tank to provide clearance to allow installation of the gas cap base. In conjunction with tube 17, this open space also facilitates ventilation and allows for stray rain or fluids to drain away.

Figure 2:
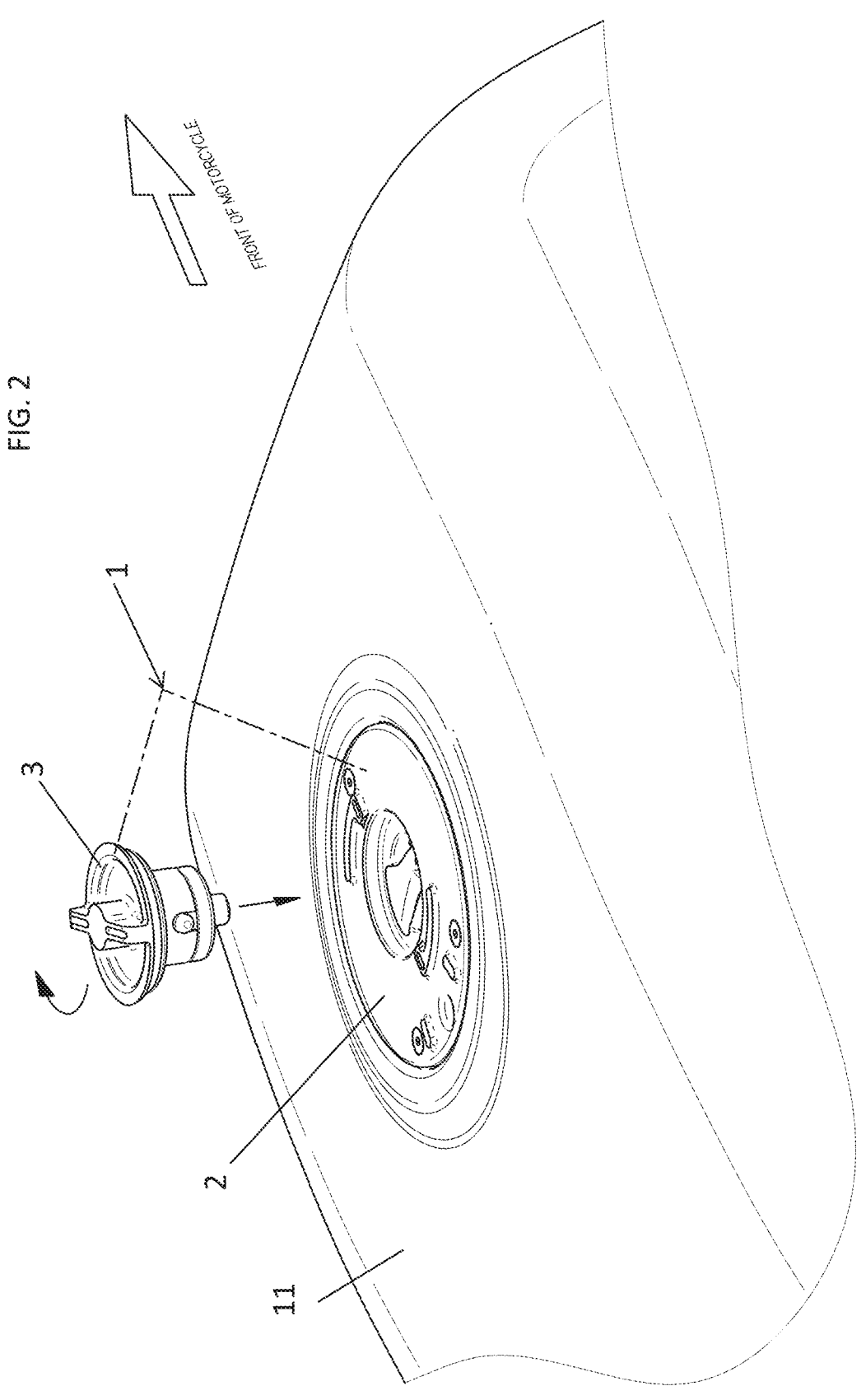
FIG. 2 is a pictorial view showing the cap of the device being installed into the base of the device with the base installed onto the motorcycle gas tank.
Figure 3:
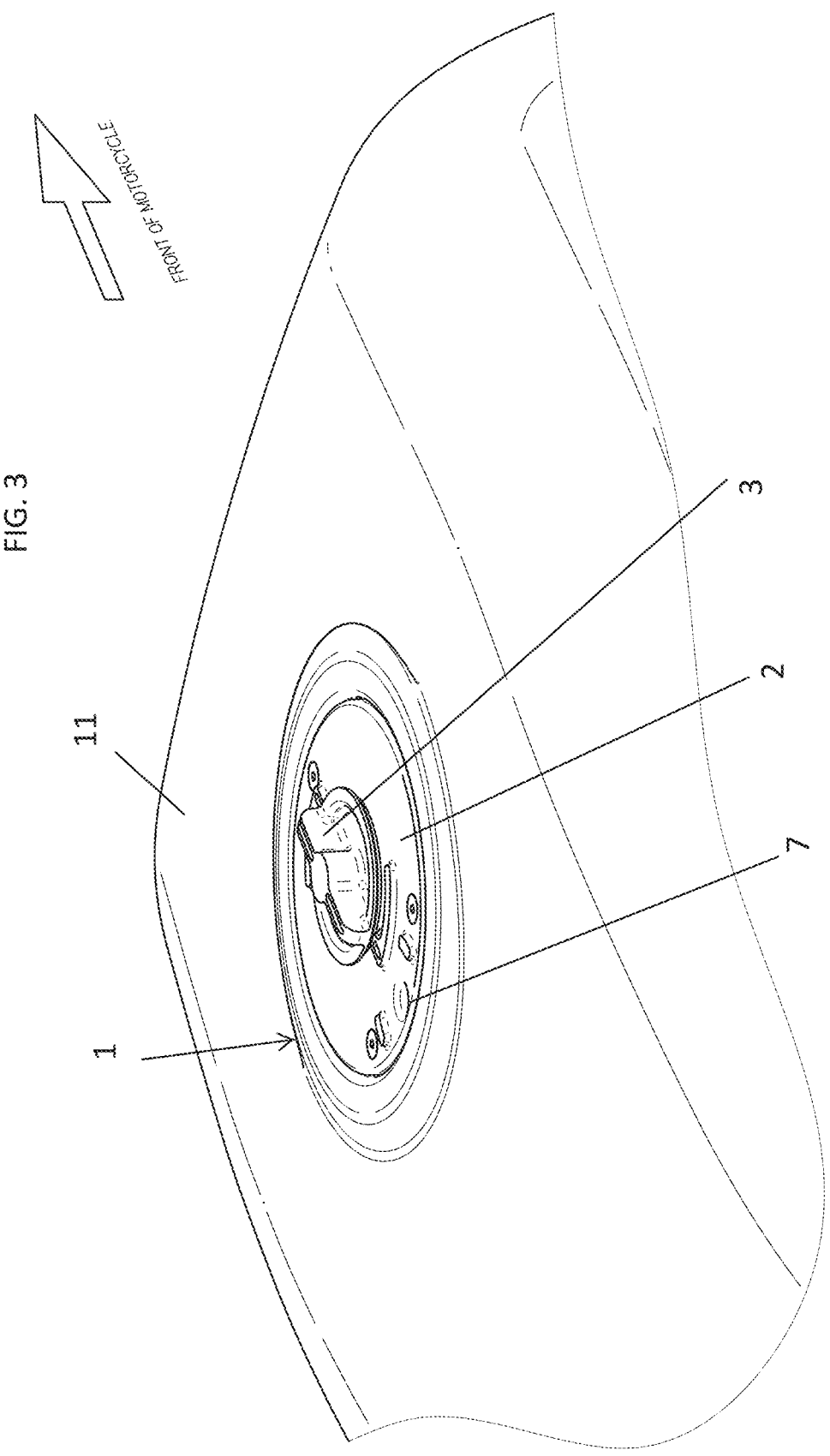
FIG. 3 is a pictorial view showing the cap of the device fully installed into the base of the device and in place on the motorcycle gas tank.
Figure 4:
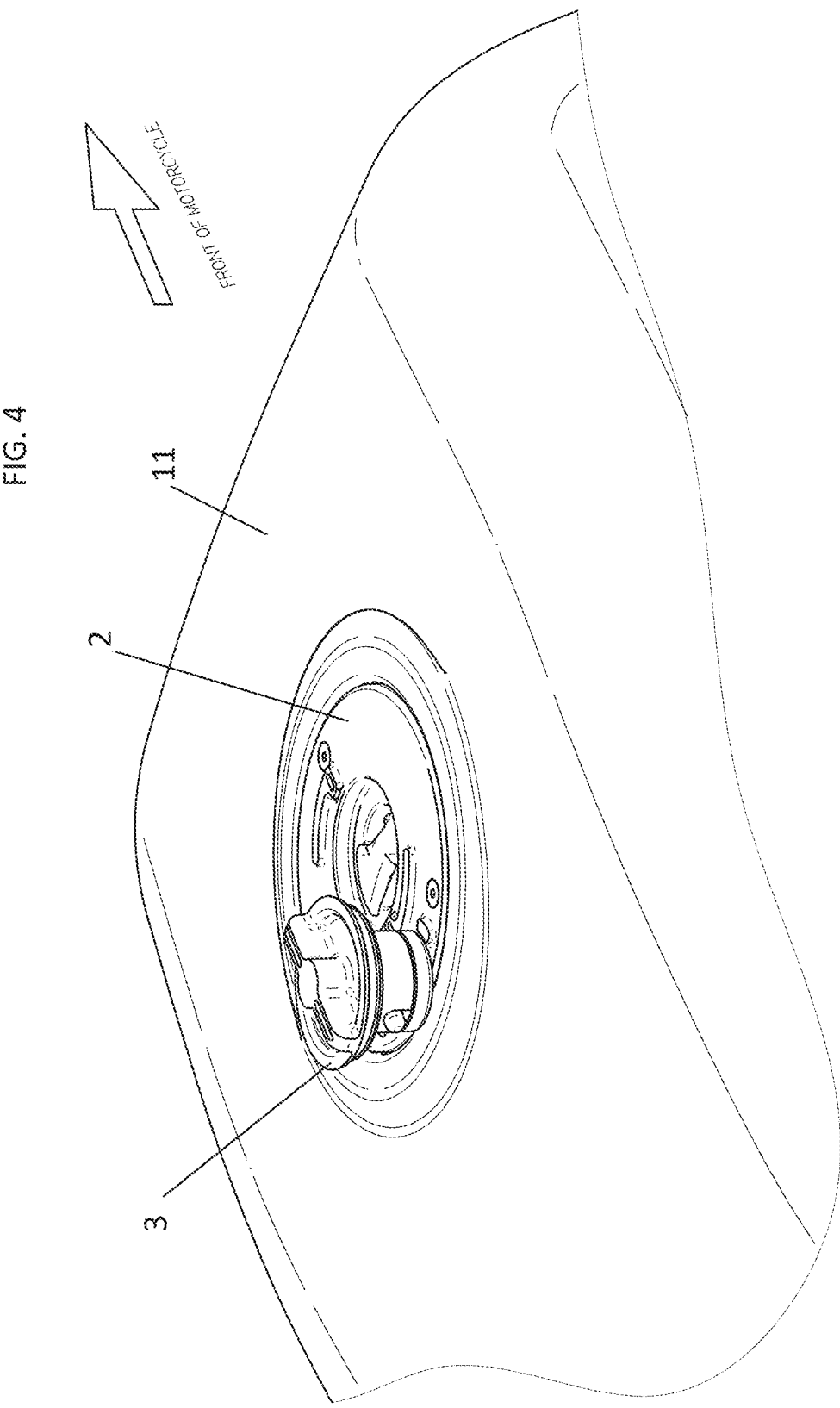
FIG. 4 is a pictorial view showing the cap of the device stored on the base of the device as it would be during fueling.

Cap 3 itself is inserted into base 2 by dropping the cap into the base and exerting clockwise force as illustrated in FIG. 2. FIG. 3 shows the cap and base installed for operating the motorcycle. FIG. 4 illustrates that the cap is stored on the base while the motorcycle is being fueled.

Figure 5:
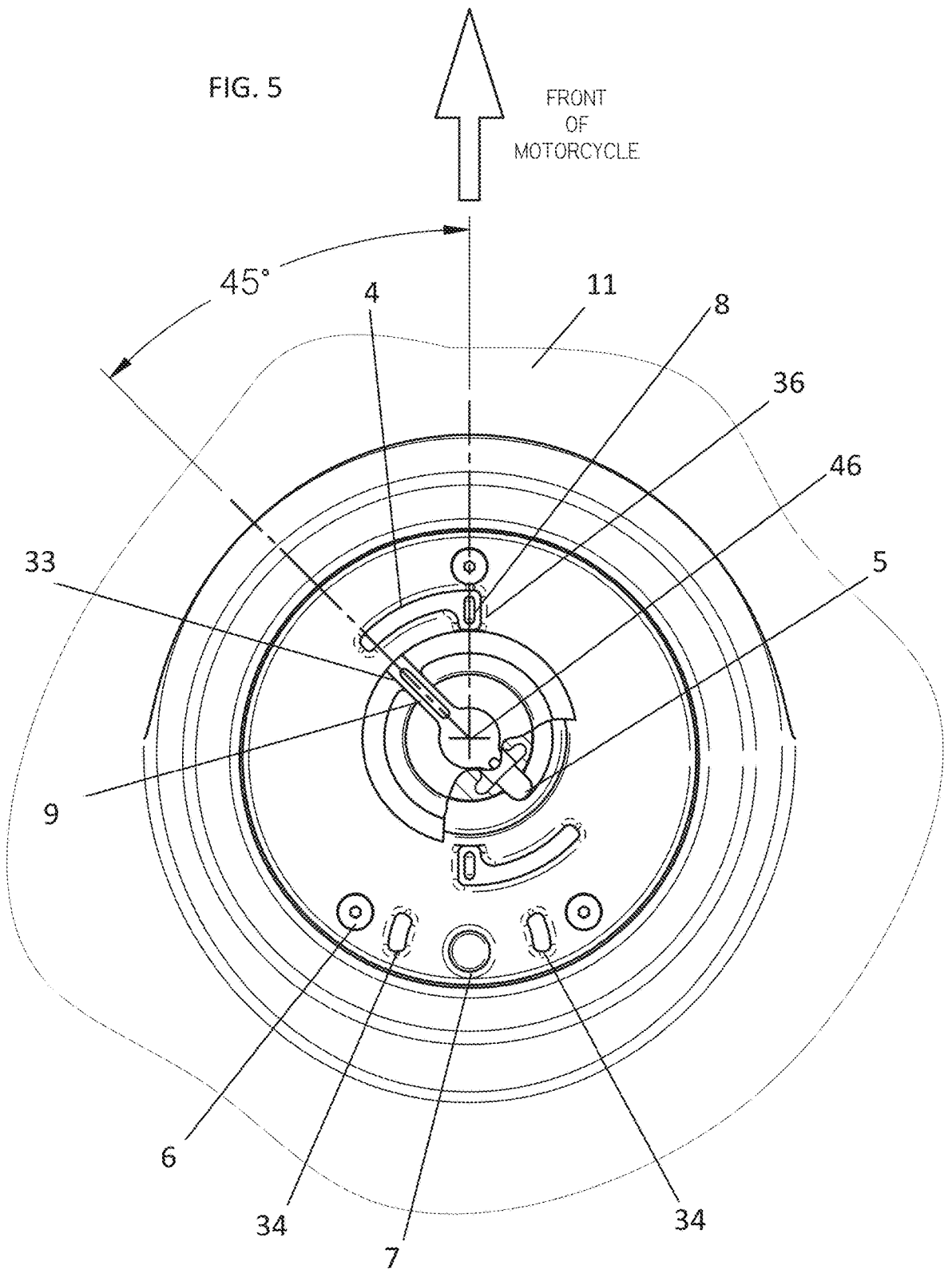
FIG. 5 is a top view showing the cap of the device positioned into the base of the device prior to rotating the cap to lock it into place.
Figure 6:
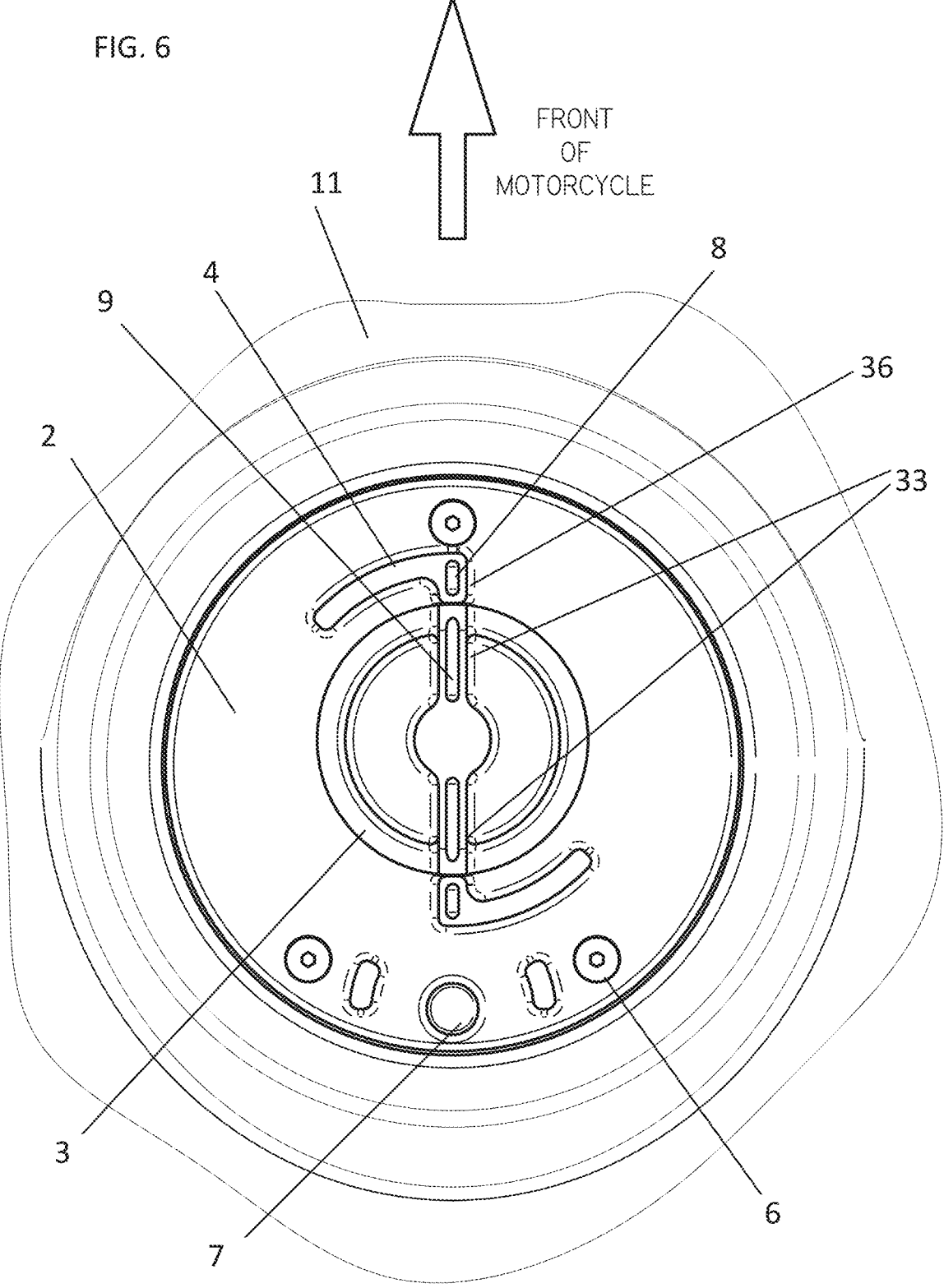
FIG. 6 is a top view showing the cap of the device locked into the base of the device and in place on the motorcycle gas tank.
Figure 7:
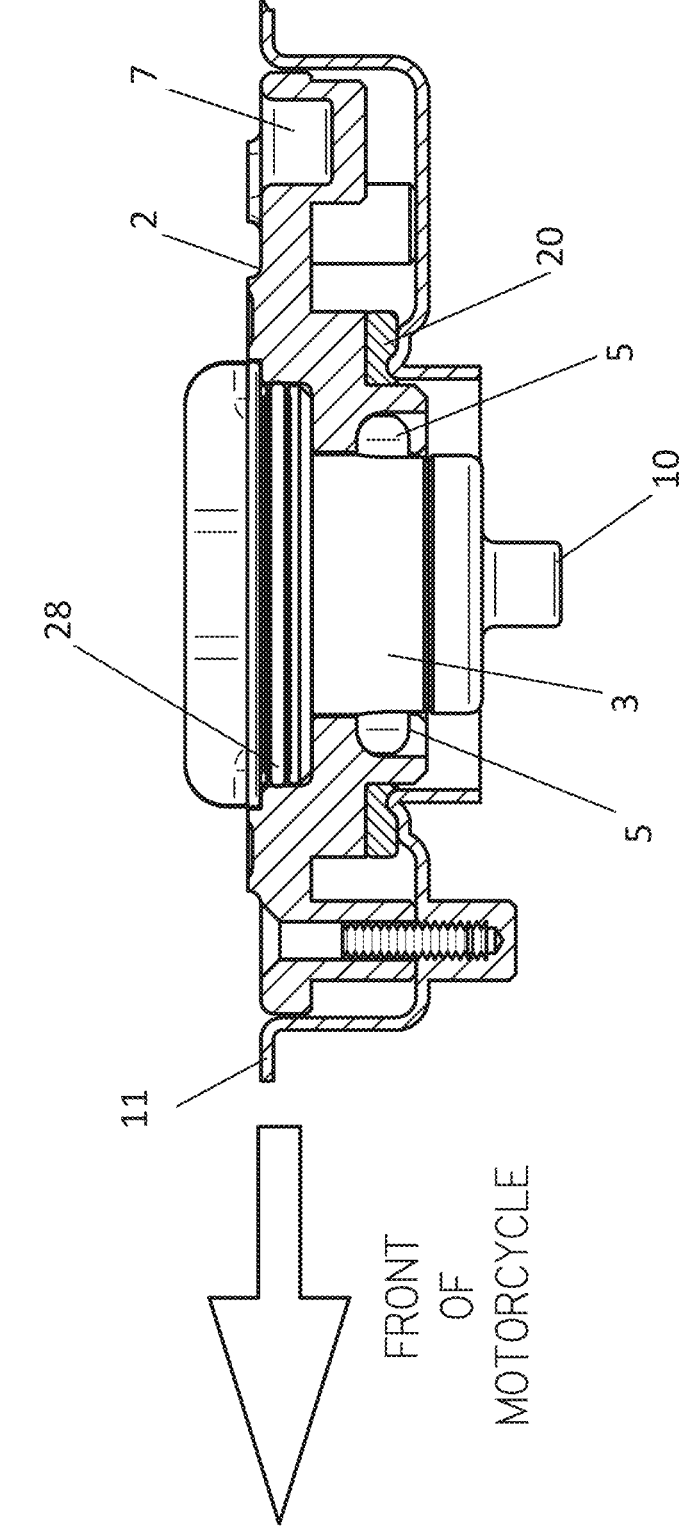
FIG. 7 is a sectioned side view showing the relationship of the cap of the device installed into the base of the device.
Figure 8:
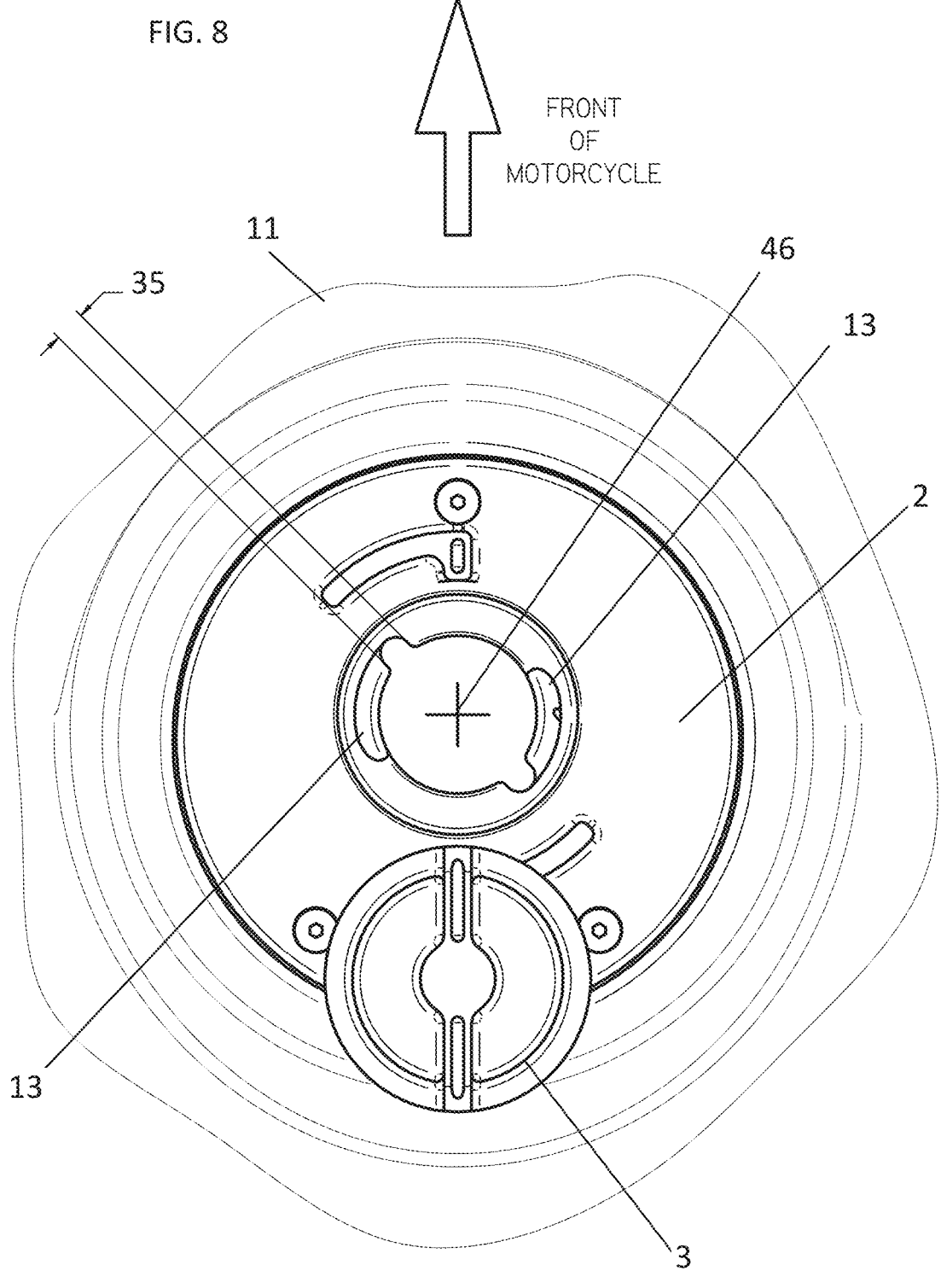
FIG. 8 is a top view showing the cap of the device stored on the base of the device as it would be during fueling.
Figure 9:
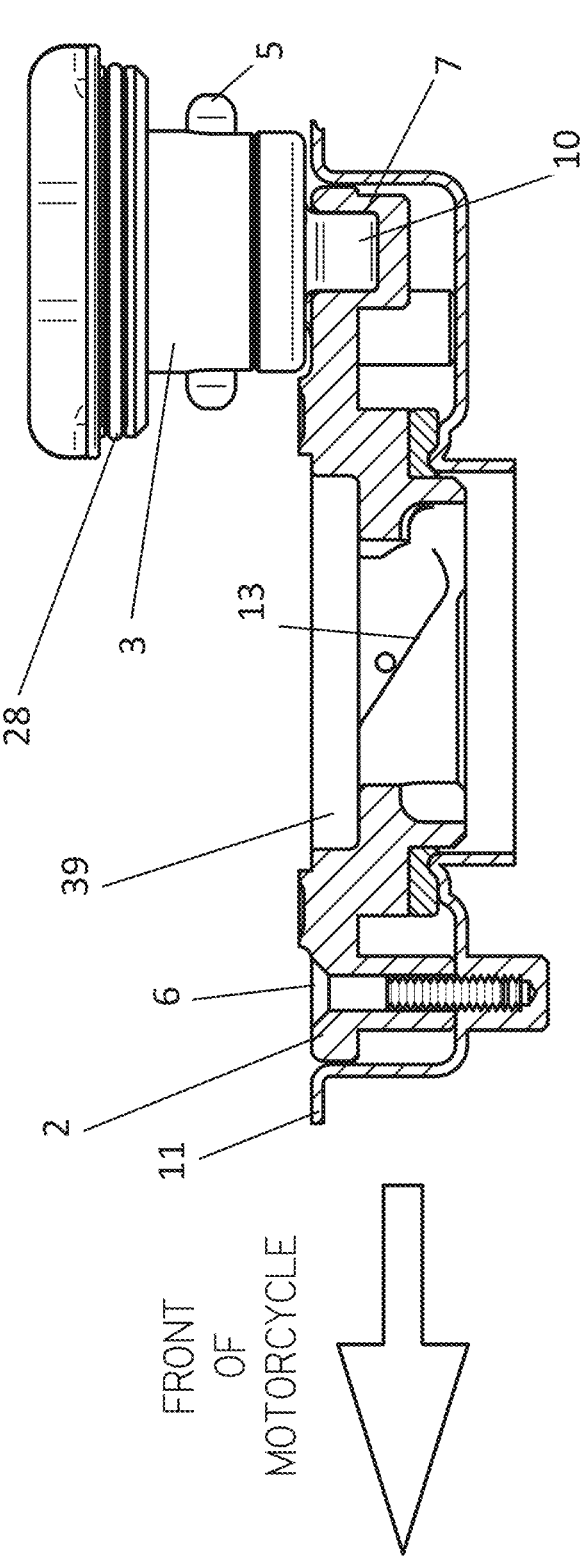
FIG. 9 is a sectioned side view showing the relationship of the cap of the device stored on the base of the device as it would be during fueling.
Figure 10:
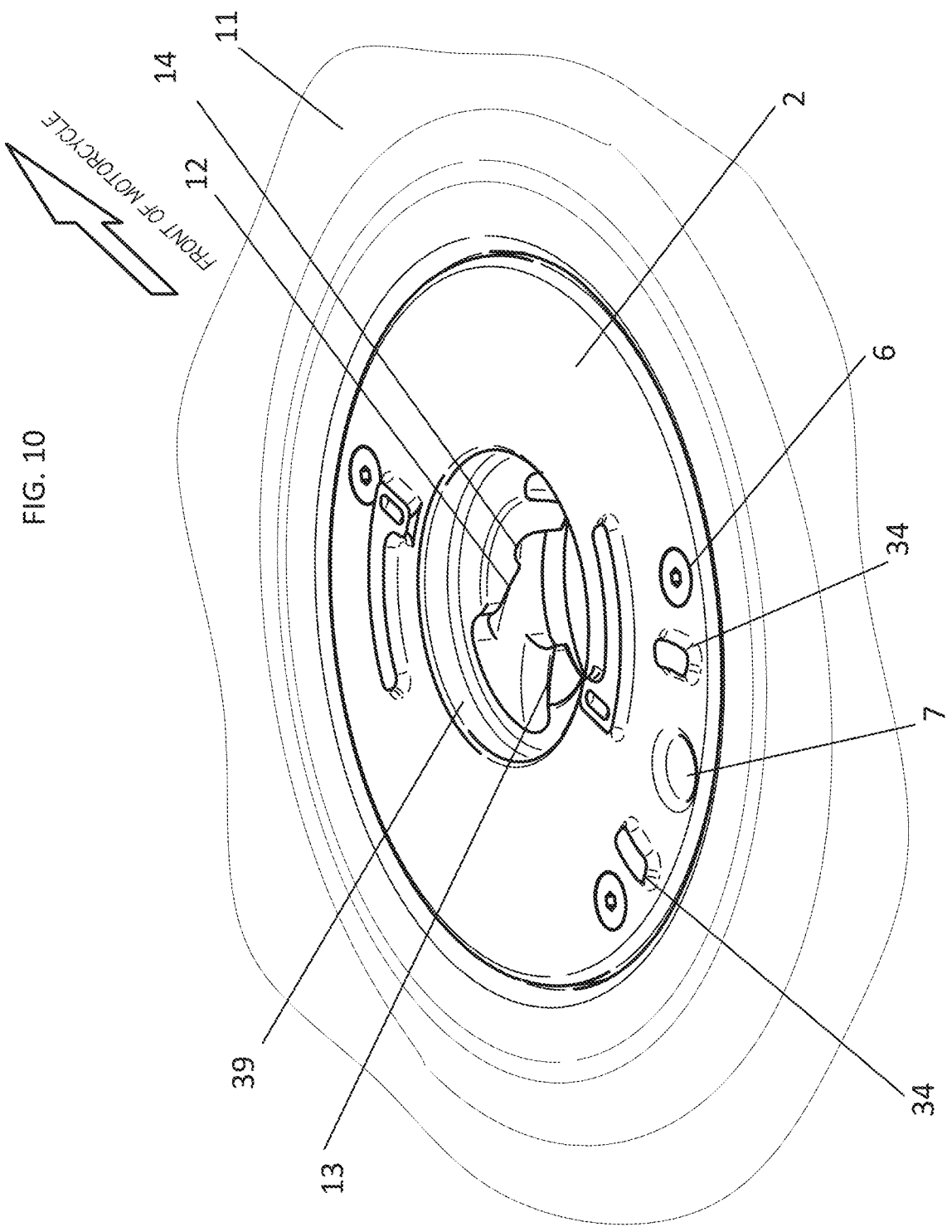
FIG. 10 is a pictorial view showing the ramp and detent features that allow the cap of the device to be inserted into, removed from and locked into the base of the device.
Figure 11:
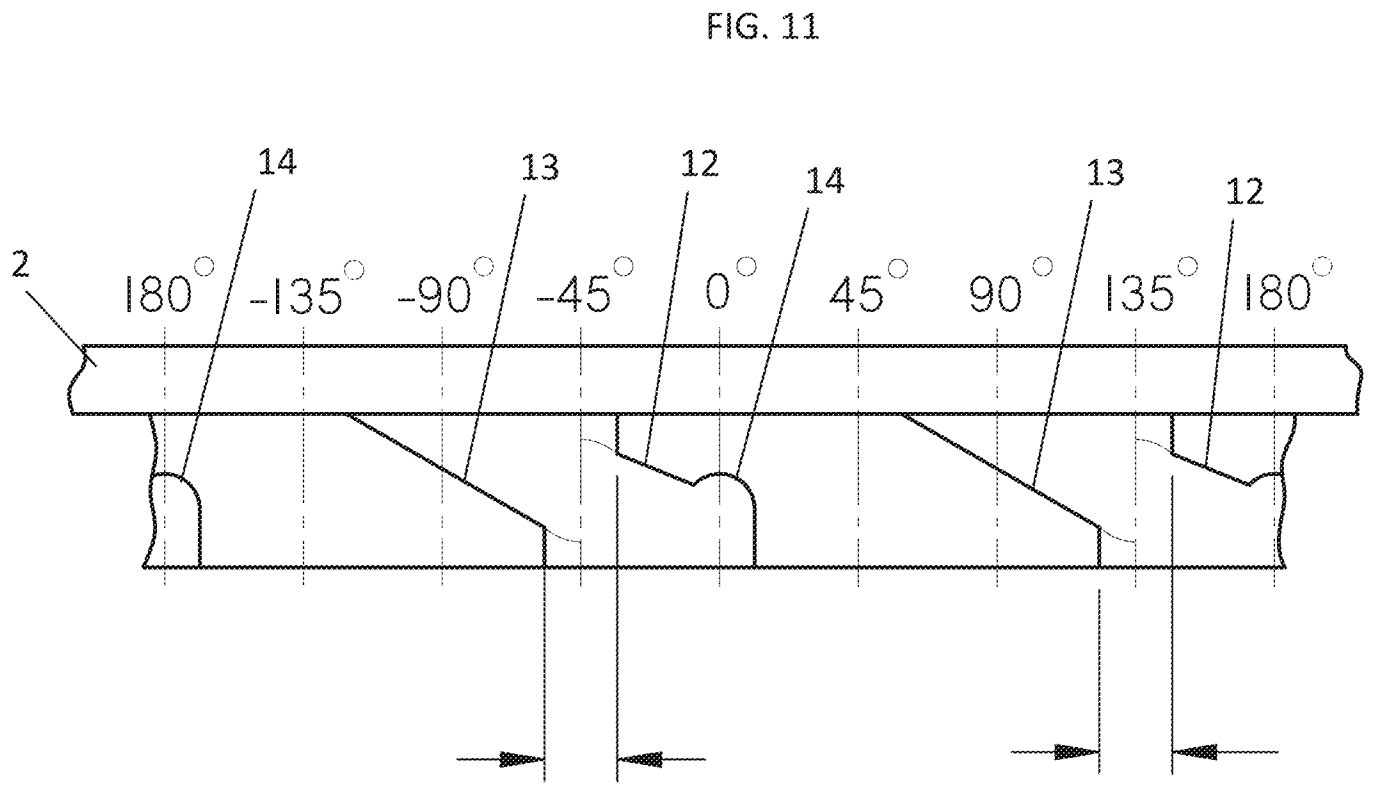

FIG. 5 is a partial cutaway top view that shows cap 3 as it is inserted into the base 2. As shown, the cap is resting at a 45-degree angle from the front of the motorcycle. Normally, when in this position, the O-ring 28 is resting atop the base 2 since it can only insert into the base with downward force that would compress the O-ring. The locking pin 5 has dropped into the insertion gap 35 (see FIG. 11).

Locking features of cap 3 and insertion features of base 2 are 180 degrees rotationally symmetrical allowing the cap to be inserted the same in one position as a position rotated 180 degrees. This allows the cap to be evenly driven into and out of the base as the locking pin 5 travels along the ramp features 12 and 13. It also allows pin 5 to rest in the detents 14 with even force.

After placing the cap into the base at the 45-degree angle shown, the user rotates the cap 45 degrees clockwise to the zero-degree (front of motorcycle) position. In doing this, the locking pin is pulled downward along ramp 12. This forces the cap downward and compresses the O-ring 28 into place within sealing surface 39 of base 2. The O-ring seals against a cylindrical area 39 sized to properly seal the O-ring.

At the end of 45 degrees of travel, at the zero degrees position (front of motorcycle), the locking pin 5 "snaps" into detent 14. This is facilitated by spring force applied by compression spring 30 and plunger 29. Vertical travel of the locking pin 5 with respect to the cap is limited such that it allows up and down motion to cause the cap to "snap" into place but still allows the locking pin to pull and push the cap down to seat and up to disengage it from the base. A slot 38 in the cap 3 serves two purposes: first, it allows range of motion to allow the locking pin to "snap" into place while limiting range of motion to still allow the locking pin 5 to be forced down for insertion by ramp 12 and up for removal by ramp 13; and second, it prevents the locking pin 5 from rotating axially with respect to the center of the cap 46 so that cap 3 rotates with locking pin 5.

Ventilation is required to allow fuel to flow out of the gas tank to the engine without creating a vacuum that would stop or restrict flow. A ventilation system should prevent rain, other fluids or debris from entering the gas tank while still allowing fuel to be displaced by air in the tank. A ventilation system should also prevent fuel from flowing out of the gas tank to the extent possible in the event the motorcycle falls on its side or goes upside down.

Figure 12:
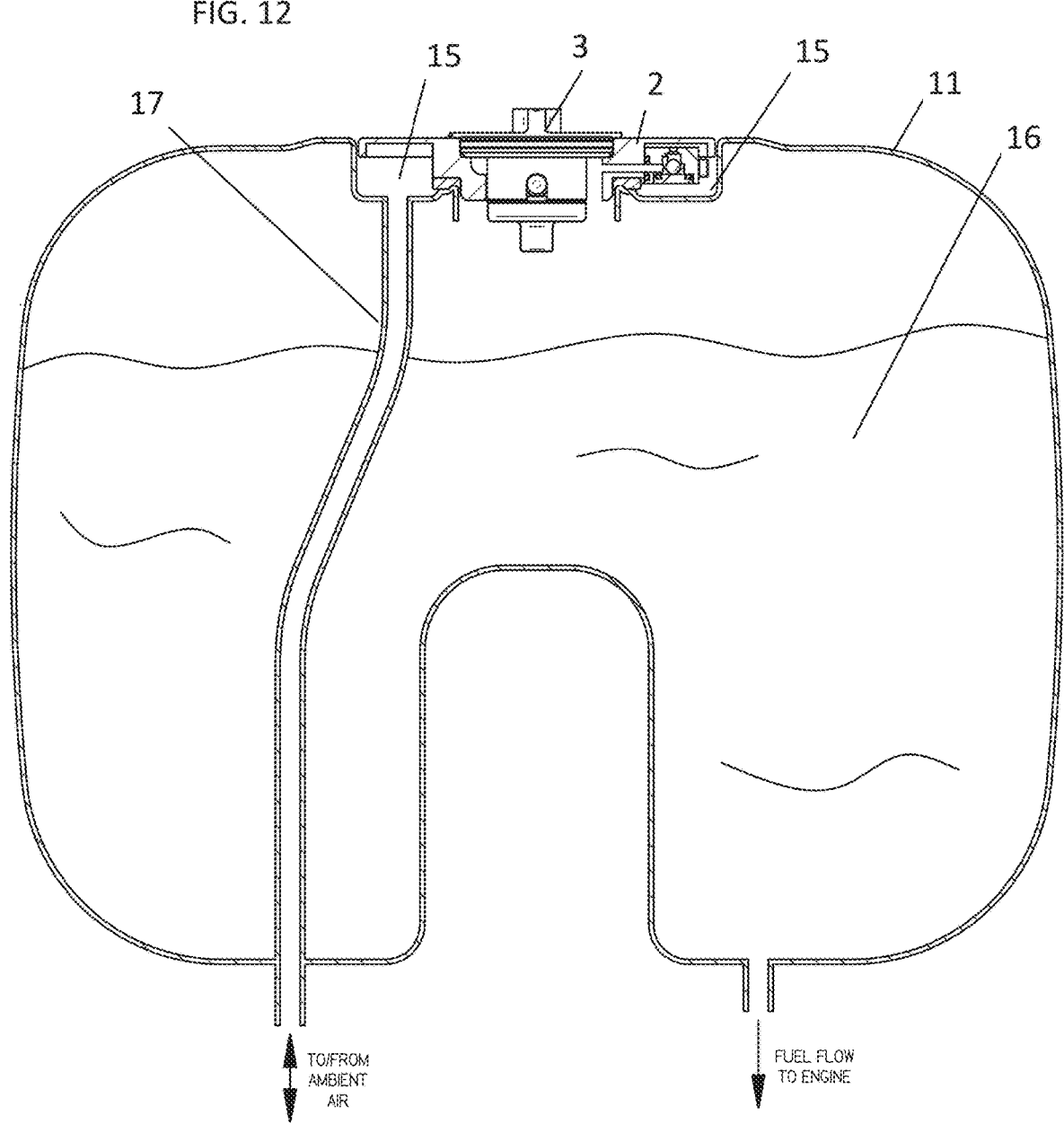
FIG. 12 is a sectioned view of the motorcycle gas tank with the base and cap of the device installed showing how fuel and air relate to the invention and the motorcycle itself.
Figure 13:
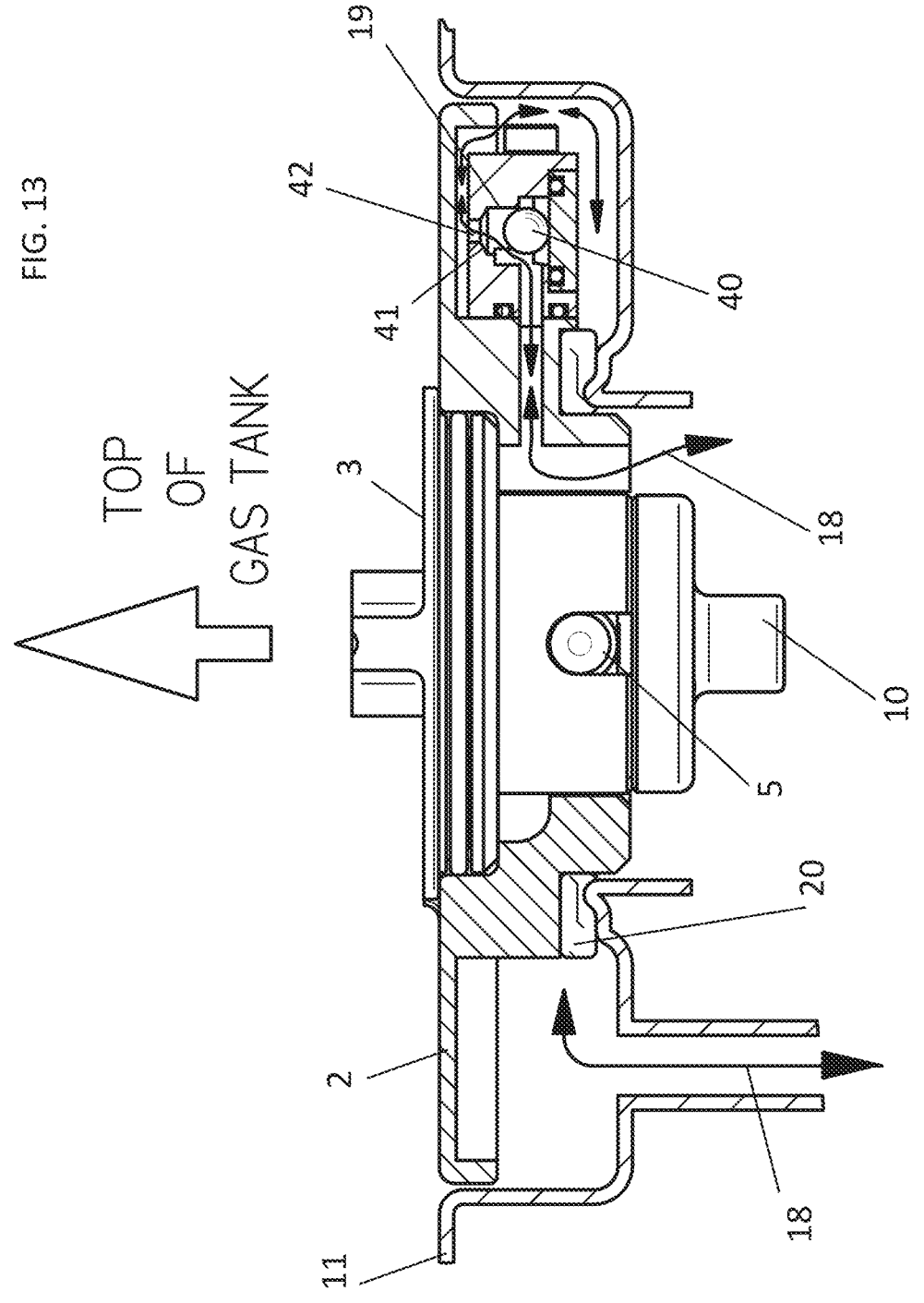
FIG. 13 is a sectioned view of the base and cap of the device installed on the motorcycle gas tank showing how the device allows ventilation into and out of the gas tank and how rainwater would flow out rather than running into the gas tank.
Figure 14:
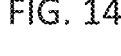
FIG. 14 is a close-up sectioned view of the device tilted showing how ventilation would be shut off by gravity and/or pressure of fuel in the event of tip-over or crash.

The ventilation system provided in the present invention is illustrated in FIGS. 12, 13 and 14. FIG. 12 shows a cutaway view of the gas tank with base and cap installed and partially filled with gas 16. It shows invention 1 installed into cylindrical recessed area 15. Recessed area 15 allows air and fluid to move about its perimeter and is connected to tube 17. Tube 17 is isolated from the gas tank interior yet open to allow ambient air to flow into recessed area 15. Tube 17 also serves to allow rainwater and fuel overflow to run out of cylindrical recessed area 15. This configuration is common to motorcycles for which the present invention is adaptable.

In FIG. 13 arrows 18 show the pathway for air to enter the gas tank to displace gas with air as gas flows to the engine. This pathway would also allow air to escape out to prevent over-pressure in the gas tank caused by air or gas vapor expansion (such as on a hot day). Ball 40 is contained in chamber 19. Normally, air can flow through chamber 19 around the ball. Should the motorcycle fall on its side or go upside down, the force of gas against the ball would move the ball into the tapered portion 41 of chamber 19 so that it blocks passage 42. This prevents excess gas from spilling out of the gas tank in the event of a tip-over or crash.

Figure 15:
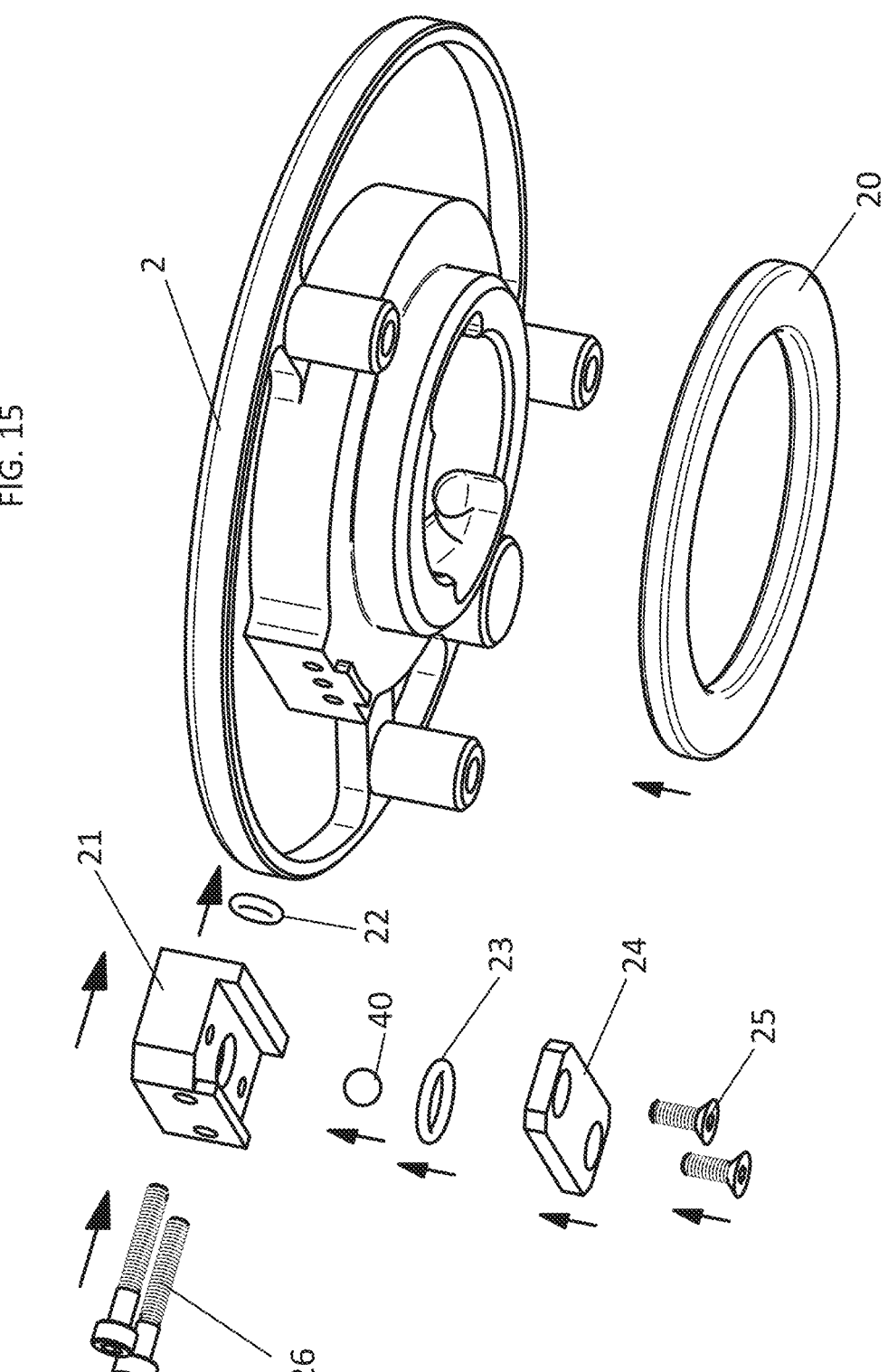
FIG. 15 is a pictorial view showing the parts that comprise the base of the device.
Figure 16:
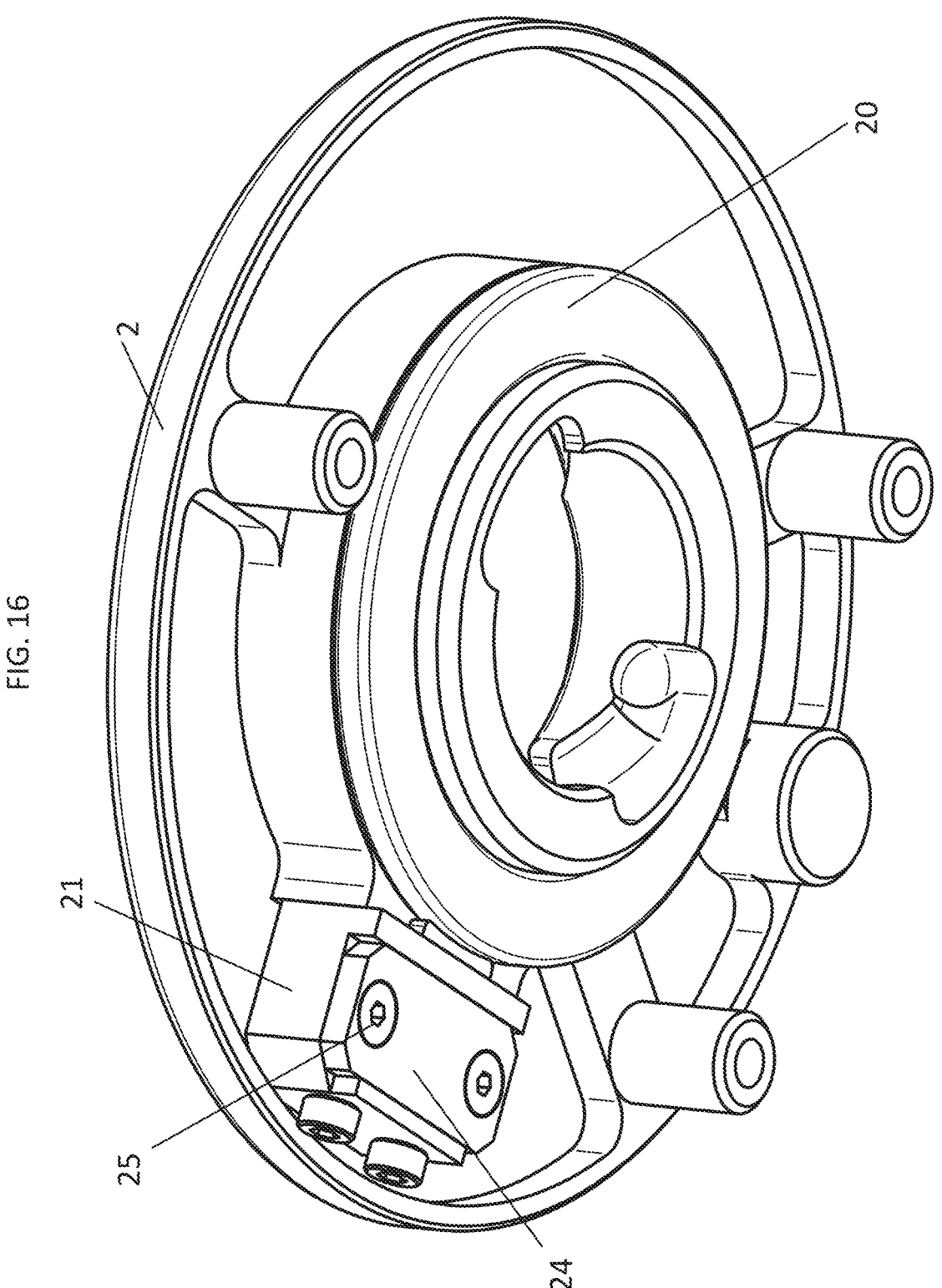
FIG. 16 is a pictorial view view showing the base of the device assembled and ready for installation onto the motorcycle gas tank.

FIG. 15 is an exploded view of the complete base assembly 2. It shows that the ventilation system is installed to the base with screws 26. The ventilation system consists of block 21 that contains chamber 19, tapered portion of chamber 41 and air passage 42. Ball 40 is inserted into block 21. Plate 24 is attached to block 21 with screws 25. O-rings 22 and 23 ensure that ventilation is channeled properly without air or fluids escaping inadvertently. Elastomeric (rubber) seal 20 is also shown as it installs onto base 2. FIG. 16 is a pictorial view of base 2 completely assembled.

Figure 17:
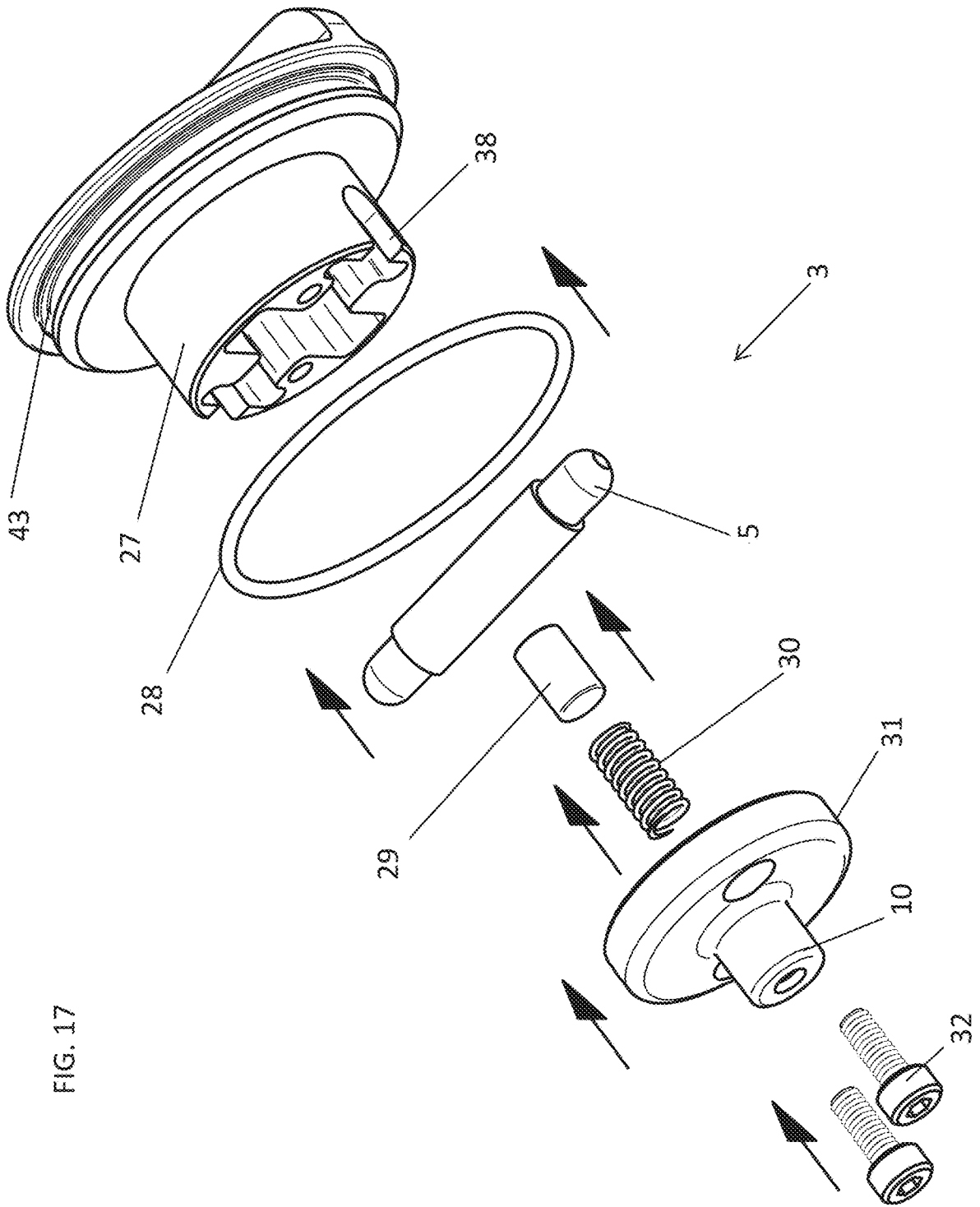
FIG. 17 is a pictorial view showing the parts that comprise the cap of the device.

FIG. 17 shows the parts that comprise cap 3. The O-ring 28 installs into O-ring groove 43 of the upper cap structure 27. The lower cap structure 31 including cylindrical protrusion 10 is attached to the upper cap structure 27 with screws 32. The spring 30, plunger 29 and locking pin 5 are all put into place and contained as upper cap structure 27 and lower cap structure 31 are mated.

Figure 18:
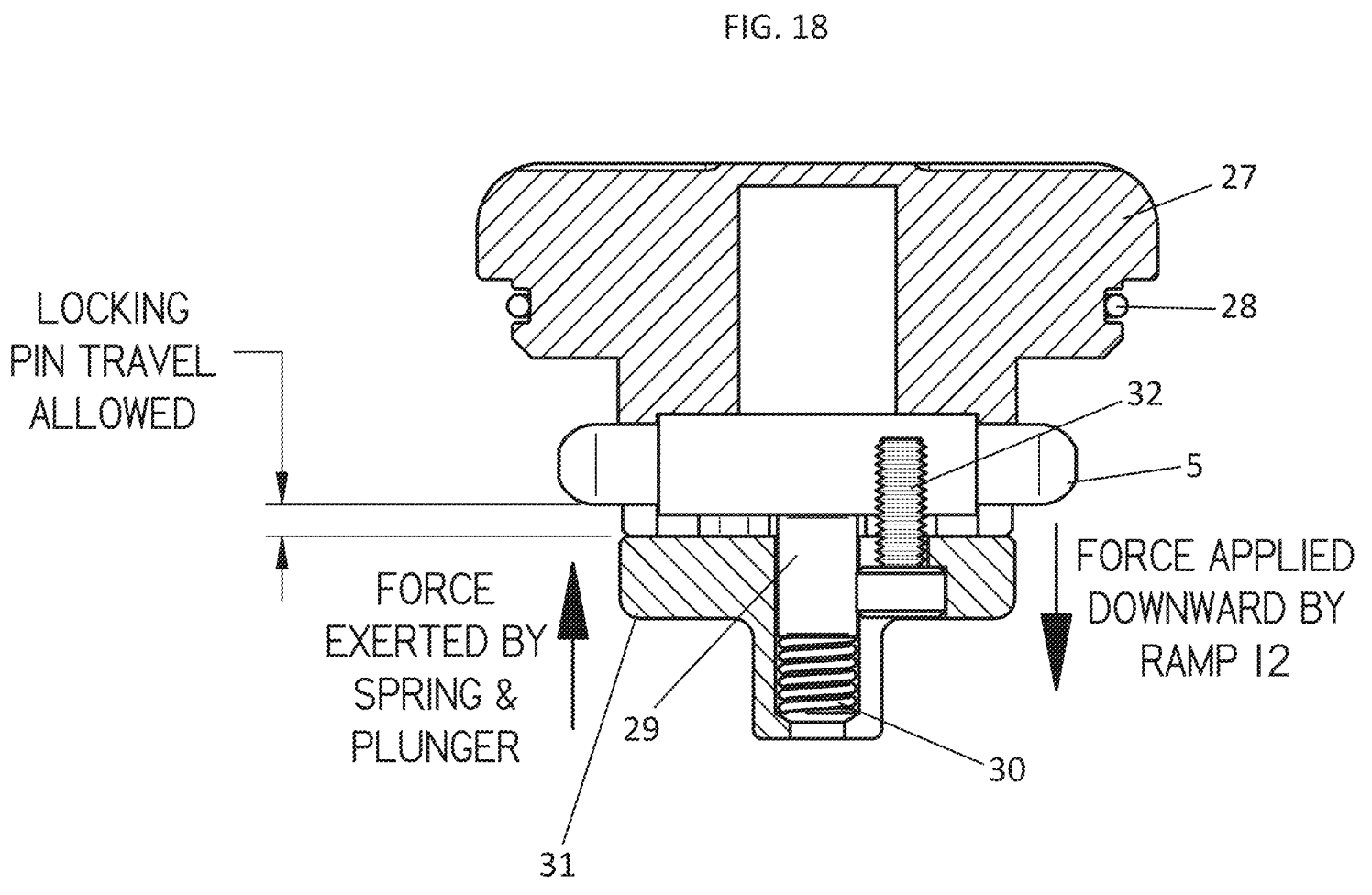

FIG. 18 is a sectioned view of cap 3 fully assembled. There is an arrow pointing upward on the left side showing the force exerted to locking pin 5 by spring 30 and plunger 29. This is the force that causes locking pin 5 to snap into detents 14 at the full closed (passively locked) position. The downward arrow on the right side indicates the force exerted by ramp 12 as the cap is rotated and pulled down into the closed position. FIG. 18 also illustrates the amount of travel of pin 5 limited by the length of slot 38. This amount of travel is adequate to allow the locking pin 5 to ride over into detent 14 while still allowing the locking pin 5 to move the cap in or out as it is rotated clockwise or counterclockwise.

In summary, the Figures define a motorcycle gas cap for use with a motorcycle. The motorcycle having defined to include a gas tank, the gas tank having a recessed space, a gas tank opening defined within the recessed space, and a ventilation tube to vent air. The motorcycle gas cap includes: (a) a base secured into the recessed space, the base having a base opening configured for fluid exchange with the gas tank opening, the base further having a ventilation mechanism; (b) a gas cap removably configured to twist in one direction into a locking position and twist in an opposition direction to an unlocking position such that the gas cap is removable from the base, the gas cap having a plunger extending downwardly from the gas cap; and (c) a hole positioned on a top portion of the base and sized to receive the plunger such that when the gas cap is removed from the base the plunger can rest in the hole.

In other aspects of the invention, the base is defined to have: (a) a top surface face configured to fit within the gas take opening; (b) a bottom member extending below the top surface face and having an opening configured around the base opening, the bottom member including a pair of diametrically opposed ramps positioned in the bottom member around the opening and further includes detents positioned at ends of the ramps; (c) an annual ring extending from the bottom member; (d) an o-ring seal placed around the annual ring of the base to form an gas and liquid tight seal between the base on the opening of the gas tank; and (e) the ventilation mechanism being secured to an outer edge of the bottom member, the ventilation mechanism in fluid communication with the vent tube.

In other aspects of the invention, the ventilation mechanism of the base includes: (a) a block secured to the outer edge of the bottom member, the block having a chamber, a tapered portion positioned above the chamber, and an air passage; (b) a ball positioned into the chamber; and (c) a plate attached to the block to secure the ball within the chamber.

In yet other aspects of the invention the gas cap includes: (a) a top portion, with at least one handle extending upwardly away from the top portion; (b) an upper cap structure positioned below the top portion, the upper cap structure having a groove; (c) an o-ring situation in the groove of the upper cap structure; (d) the upper cap structure further having a slot bisecting the length of the upper cap structure; (e) a locking pin secured in the slot and having ends positioned into the ramps defined on the base when the gaps cap is inserted into the base; (f) a lower cap structure secured to the upper cap structure, the lower cap structure having the plunger extending downwardly from the lower cap structure; and (g) a spring and plunger positioned between the locking pin and the lower cap structure configured to exert a force on the locking pin to maintain the ends of the locking pin in the ramps and detent when in the locking position.

In other aspects of the invention, the base further includes a raised feature curved along an arcuate path on the top portion of the base and a groove along the end of the arcuate path, and a raised rim positioned on the gas cap configured to be aligned with the groove when the gas cap is in a locking position and aligned with a start of the raised feature when in the unlocking position.

And in yet other aspects of the invention, the gas cap is rotatable approximately 45 degrees between the locking position and an unseating position. With the gas cap being rotatable beyond the 45 degrees to an unlocking position configured to allow the removal of the gas cap from the base.

In other aspects of the invention, the diametrically opposed ramps are configured in a downward clockwise rotation around the base such that the twisting of the gas cap to a locking position forces the gas cap downwardly into the base.

From the foregoing and as mentioned above, it is observed that numerous variations and modifications may be effected without departing from the spirit and scope of the novel concept of the invention. It is to be understood that no limitation with respect to the embodiments illustrated herein is intended or should be inferred. It is intended to cover, by the appended claims, all such modifications within the scope of the appended claims.

The invention claimed is:

1. A motorcycle gas cap for use with a motorcycle, wherein the motorcycle has a defined gas tank, the gas tank having a recessed space, a gas tank opening defined within the recessed space, and a ventilation tube to vent air, the motorcycle gas cap comprising:

a base secured into the recessed space, the base having a base opening configured for fluid exchange with the gas tank opening, the base further having a ventilation mechanism;

a gas cap removably configured to twist in one direction into a locking position and twist in an opposition direction to an unlocking position such that the gas cap is removable from the base, the gas cap having a plunger extending downwardly from the gas cap; and a hole positioned on a top portion of the base and sized to receive the plunger such that when the gas cap is removed from the base the plunger can rest in the hole.

2. The motorcycle gas cap of claim 1, wherein the base includes:

a top surface face configured to fit within the gas tank opening;

a bottom member extending below the top surface face and having an opening configured around the base opening, the bottom member including a pair of diametrically opposed ramps positioned in the bottom member around the opening and further includes detents positioned at ends of the ramps;

an annual ring extending from the bottom member;

an o-ring seal placed around the annual ring of the base to form a gas and liquid tight seal between the base on the opening of the gas tank; and the ventilation mechanism being secured to an outer edge of the bottom member, the ventilation mechanism in fluid communication with the vent tube.

3. The motorcycle gas cap of claim 2, wherein the ventilation mechanism of the base includes:

a block secured to the outer edge of the bottom member, the block having a chamber, a tapered portion positioned above the chamber, and an air passage;

a ball positioned into the chamber; and a plate attached to the block to secure the ball within the chamber.

4. The motorcycle gas cap of claim 2, wherein the gas cap includes:

a top portion, with at least one handle extending upwardly away from the top portion, an upper cap structure positioned below the top portion, the upper cap structure having a groove;

an o-ring situated in the groove of the upper cap structure;

the upper cap structure further having a slot bisecting the length of the upper cap structure, a locking pin secured in the slot and having ends positioned into the ramps defined on the base when the gaps cap is inserted into the base;

a lower cap structure secured to the upper cap structure, the lower cap structure having the plunger extending downwardly from the lower cap structure; and a spring and plunger positioned between the locking pin and the lower cap structure configured to exert a force on the locking pin to maintain the ends of the locking pin in the ramps and detent when in the locking position.

5. The motorcycle gas cap of claim 1, wherein the base further includes a raised feature curved along an arcuate path on the top portion of the base and a groove along the end of the arcuate path, and a raised rim positioned on the gas cap configured to be aligned with the groove when the gas cap is in a locking position and aligned with a start of the raised feature when in the unlocking position.

6. The motorcycle gas cap of claim 1, wherein the gas cap is rotatable approximately 45 degrees between the locking position and an unseating position.

7. The motorcycle gas cap of claim 6, wherein the gas cap is rotatable beyond the 45 degrees to an unlocking position configured to remove the gas cap from the base.

8. The motorcycle gas cap of claim 2, wherein the diametrically opposed ramps are configured in a downward clockwise rotation around the base such that the twisting of the gas cap to a locking position forces the gas cap downwardly into the base.

9. A gas cap for use with a vehicle gas tank, wherein the vehicle gas tank having a recessed space, a gas tank opening defined within the recessed space, and a ventilation tube to vent air, the gas cap comprising:

a base secured into the recessed space, the base having a base opening configured for fluid exchange with the gas tank opening, the base further having a ventilation mechanism;

a gas cap removably configured to twist in one direction into a locking position and twist in an opposition direction to an unlocking position such that the gas cap is removable from the base, the gas cap having a plunger extending downwardly from the gas cap; and a hole positioned on a top portion of the base and sized to receive the plunger such that when the gas cap is removed from the base the plunger can rest in the hole.

10. The gas cap of claim 9, wherein the base includes:

a top surface face configured to fit within the gas tank opening;

a bottom member extending below the top surface face and having an opening configured around the base opening, the bottom member including a pair of diametrically opposed ramps positioned in the bottom member around the opening and further includes detents positioned at ends of the ramps;

an annual ring extending from the bottom member;

an o-ring seal placed around the annual ring of the base to form a gas and liquid tight seal between the base on the opening of the gas tank; and the ventilation mechanism being secured to an outer edge of the bottom member, the ventilation mechanism in fluid communication with the vent tube.

11. The gas cap of claim 10, wherein the ventilation mechanism of the base includes:

a block secured to the outer edge of the bottom member, the block having a chamber, a tapered portion positioned above the chamber, and an air passage;

a ball positioned into the chamber; and a plate attached to the block to secure the ball within the chamber.

12. The gas cap of claim 11, wherein the gas cap includes:

a top portion, with at least one handle extending upwardly away from the top portion, an upper cap structure positioned below the top portion, the upper cap structure having a groove;

an o-ring situated in the groove of the upper cap structure;

the upper cap structure further having a slot bisecting the length of the upper cap structure, a locking pin secured in the slot and having ends positioned into the ramps defined on the base when the gas cap is inserted into the base;

a lower cap structure secured to the upper cap structure, the lower cap structure having the plunger extending downwardly from the lower cap structure; and a spring and plunger positioned between the locking pin and the lower cap structure configured to exert a force on the locking pin to maintain the ends of the locking pin in the ramps and detent when in the locking position.

13. The gas cap of claim 9, wherein the base further includes a raised feature curved along an arcuate path on the top portion of the base and a groove along the end of the arcuate path, and a raised rim positioned on the gas cap configured to be aligned with the groove when the gas cap is in a locking position and aligned with a start of the raised feature when in the unlocking position.

14. The gas cap of claim 9, wherein the gas cap is rotatable approximately 45 degrees between the locking position and an unseating position.

15. The gas cap of claim 14, wherein the gas cap is rotatable beyond the 45 degrees to an unlocking position configured to remove the gas cap from the base.

16. The gas cap of claim 10, wherein the diametrically opposed ramps are configured in a downward clockwise rotation around the base such that the twisting of the gas cap to a locking position forces the gas cap downwardly into the base.

* * * * *